United States Patent [19]

Udagawa et al.

[11] Patent Number: 4,869,516
[45] Date of Patent: Sep. 26, 1989

[54] STEEL LAMINATE GASKETS

[75] Inventors: Tsunekazu Udagawa, Ichikawa; Yasuji Hiramatsu, Kasukabe; Hidetaka Nakasone, Omiya; Yoshio Yamada, Koshigaya, all of Japan

[73] Assignee: Ishikawa Gasket Co., Ltd., Tokyo, Japan

[21] Appl. No.: 139,149

[22] Filed: Dec. 23, 1987

Related U.S. Application Data

[63] Continuation of Ser. No. 835,906, Mar. 4, 1986, abandoned.

[30] Foreign Application Priority Data

Dec. 14, 1984 [JP] Japan ................. 59-188854

[51] Int. Cl.[4] .............................. F16J 15/08
[52] U.S. Cl. ................. 277/234; 277/235 B; 277/236
[58] Field of Search ............. 277/235 B, 235 R, 233, 277/234, 213

[56] References Cited

U.S. PATENT DOCUMENTS

| | | | |
|---|---|---|---|
| 1,241,587 | 10/1917 | Victor | 277/235 B X |
| 1,851,948 | 3/1932 | Summers | 277/235 B X |
| 2,114,442 | 4/1938 | Fitzgerald | 277/235 B X |
| 2,119,158 | 5/1938 | Frey | 277/235 B X |
| 3,738,558 | 6/1973 | Colwell | 277/235 B |
| 4,196,913 | 4/1980 | Oka | 277/235 B |

FOREIGN PATENT DOCUMENTS

| | | | |
|---|---|---|---|
| 86727 | 8/1983 | European Pat. Off. | 277/235 B |
| 1248397 | 8/1967 | Fed. Rep. of Germany | 277/235 B |
| 2717663 | 10/1978 | Fed. Rep. of Germany | 277/235 B |
| 1367422 | 6/1964 | France | 277/235 B |
| 1452723 | 9/1966 | France | 277/235 B |
| 58-51041 | 4/1984 | Japan . | |
| 2103308 | 2/1983 | United Kingdom | 277/235 B |
| 2121123 | 12/1983 | United Kingdom | 277/235 B |

Primary Examiner—Allan N. Shoap
Attorney, Agent, or Firm—Kanesaka and Takeuchi

[57] ABSTRACT

A steel laminate gasket comprises a first plate having at least one first hole, a second plate situated adjacent to the first plate, and at least one depression formed either on the first plate or the second plate and extending toward the other. The second plate is provided with at least one second hole and a bead extending around the second hole. The bead extends substantially perpendicularly to a horizontal plate of the second plate toward the first plate to abut against the first plate. Height of the depression is substantially the same as or slightly less than that of the bead so that when the first and second plates are connected together by a spot welding at the depression, the first and second plates are maintained substantially parallel to each other.

7 Claims, 2 Drawing Sheets

4,869,516

STEEL LAMINATE GASKETS

This application is a continuation of application Ser. No. 835,906, filed Mar. 4, 1986, now abandoned.

FIELD OF THE INVENTION AND RELATED ART STATEMENT

The present invention relates to a steel laminate gasket to be used for an internal combustion engine, more particularly a steel laminate gasket connected together by means of a specific welding mechanism.

Steel laminate gaskets have been widely used for sealing between two engine blocks, between an engine block and a manifold and the like of an internal combustion engine. The steel laminate gasket comprises a plurality of thin steel plates which are stacked and connected together by means of, for example, a spot welding.

In case a steel laminate gasket comprises only thin flat steel plates, the thin steel plates can be properly connected together by means of a spot welding. However, in case a steel laminate gasket is provided with a thin steel plate with a bead therein in addition to a thin flat steel plate, if the steel plates are connected together by means of a spot welding, the steel laminate gasket, sometimes, does not operate as intended and causes leakage through the gasket. This is because when the gasket is formed, the thin steel plates are not arranged parallel to each other due to a spot welding connecting the steel plates.

For example, it is assumed that, as shown in FIGS. 7 and 8, a steel laminate gasket 10 is formed of an outer plate 11 and an outer plate 12 with a bead 12a extending around a hole. When the outer plates 11, 12 are connected together by means of a spot welding 13, the outer plates 11, 12 deform slightly because the bead 12a projects toward the outer plate 11. Consequently, the outer plates 11, 12 are, no more, parallel to each other. The deformed gasket 10' as shown in FIG. 8 can not seal properly because the bead 12a adjacent to the spot welding 13 receives a special stress when comparing the bead 12a away from the spot welding 13. Especially, in case the outer plates 11, 12 are made thin, the bead 12a deforms by a spot welding. Therefore, the basket 10' does not operate as intended.

Accordingly, one object of the present invention is to provide a steel laminate gasket which can seal properly between two work pieces.

Another object of the invention is to provide a steel laminate gasket as explained above, in which steel plates can be arranged parallel to each other when connected by a spot welding.

A further object of the invention is to provide a steel laminate gasket as explained above, in which thin steel plates can be effectively and easily connected together.

Further objects and advantages of the invention will be apparent from the following description of the invention.

SUMMARY OF THE INVENTION

In accordance with the present invention, a steel laminate gasket is situated between two engine blocks with holes, for sealing the two engines blocks. The steel laminate gasket comprises a first plate having at least one first hole corresponding to the holes of the engine blocks, a second plate situated adjacent to the first plate, and at least one depression formed either on the first plate or the second plate to extend toward the other. The second plate is provided with at least one second hole corresponding to the holes of the engine blocks and a bead extending around the second hole. The bead extends substantially perpendicularly to a horizontal plate of the second plate toward the first plate to abut against the first plate. Height of the depression is substantially the same as or slightly less than that of the bead so that when the first and second plates are connected together by means of a spot welding at the depression, the first and second plates are maintained substantially parallel to each other.

The depression is formed outside the bead. Preferably, two depressions are symmetrically formed relative to the holes. Consequently, the first and second plates can be securely connected together.

DETAILED DESCRIPTION OF PREFERRED EMBODIMENTS

Figure 1:
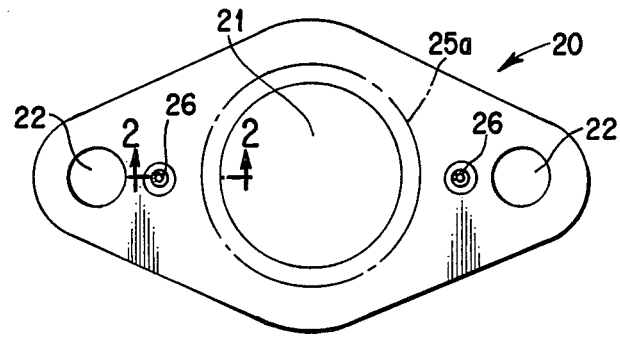
FIG. 1 is a plan view of a steel laminate gasket in accordance with the present invention.
Figure 2:
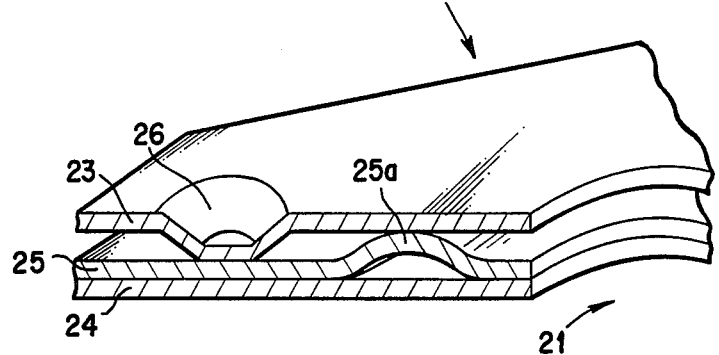
FIG. 2 is an enlarged perspective section view along line 2—2 in FIG. 1.

Referring to FIGS. 1 and 2, a steel laminate gasket 20 in accordance with the present invention is shown. The steel laminate gasket 20 is especially designed to be used as a manifold gasket, but the gasket 20 can be used as other gaskets.

The steel laminate gasket 20 includes a central hole 21 and two side holes 22, and is situated and maintained between a manifold and a cylinder head (both not shown). When the gasket 20 is situated, the central hole 21 communicates with an exhaust hole of the cylinder head. Bolts (not shown) passing through the manifold extend through the side holes 22 and are connected to the cylinder head. When the bolts are tightened, the manifold as well as the gasket 20 are securely connected to the cylinder head.

As shown in FIG. 2, the steel laminate gasket 20 comprises outer plates 23, 24 and an inner plate 25 situated between the outer plates 23, 24. The inner plate 25 is provided with a bead 25a extending around the hole 21, wherein the inner plate 25 is located on the outer plate 24, and the bead 25a abuts against the outer plate 23. When the gasket 20 is situated between the manifold and the cylinder head and is tightened, the bead 25a receives pressure applied thereto and seals by counteraction of the bead 25a. In this situation, the inner plate 25 can slightly slide relative to the outer plates 23, 24 to absorb lateral stress applied between the outer plates and the inner plate.

In the steel laminate gasket 20, the outer plate 23 is provided with two depressions 26 extending toward and abutting against the inner plate 25. Height of the depression 26 is substantially the same as height of the bead 25a so that when the bead 25a and the depressions 26 abut against the outer plate 23 and the inner plate 25 respectively, the outer plate 23 and the inner plate 25 are maintained substantially parallel to each other. A spot welding is applied onto the depressions 26 to connect the outer plates 23, 24 and the inner plate 25. When the outer plates 23, 24 and the inner plates 25 are connected by means of the spot welding, the outer plates 23, 24 and the inner plate 25 are held substantially parallel to each other. Consequently, when the gasket 20 is situated in position and tightened, the gasket 20 operates to seal properly.

Figure 3:
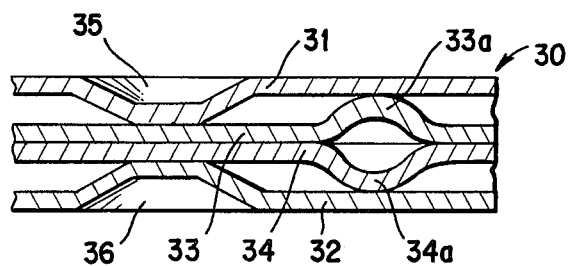
FIGS. 3–6 are section views showing different embodiments of the invention.

A steel laminate gasket 30, as shown in FIG. 3, comprises outer plates 31, 32 and two inner plates 33, 34 having head 33a, 34a. The bead 33a abuts against the outer plate 31, and the bead 34a abuts against the outer plate 32. The outer plates 31, 32 respectively include depressions 35, 36 extending toward the inner plates 33, 34. A spot welding is applied on the depressions 35, 36 so that the outer plates 31, 32 and inner plates 33, 34 are connected together to be substantially parallel to each other.

Figure 4:
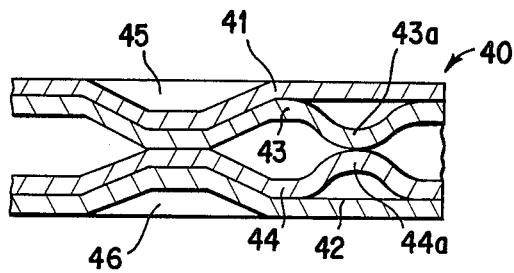

A steel laminate gasket 40 comprises outer plates 41, 42 and two inner plates 43, 44 having beads 43a, 44a, as shown in FIG. 4. The outer plate 41 and inner plate 43 are stacked together and the bead 43a extends in the direction away from the outer plate 41. Similarly, the outer plate 42 and inner plate 44 are stacked together and the bead 44a extends in the direction away from the outer plate 42. The beads 43a and 44a abut against each other. The outer plate 41 and inner plate 43 are integrally indented at a depression 45, and the outer plate 42 and inner plate 44 are integrally indented at a depression 46. When the outer plates 41, 42 and inner plates 43, 44 are integrally connected together, a spot welding is applied onto the depressions 45, 46. Consequently, the outer plates and inner plates are maintained substantially parallel to each other.

Figure 5:
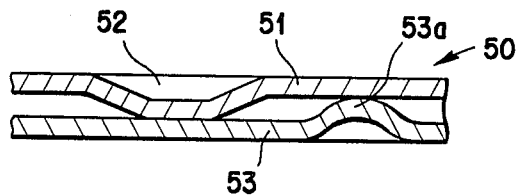

In an embodiment as shown in FIG. 5, a steel laminate gasket 50 comprises a plate 51 with a depression 52, and a plate 53 with a bead 53a. When the plates 51, 53 are connected together, a spot welding is applied onto the depression 52. Consequently, the plates 51, 53 are maintained substantially parallel to each other.

Figure 6:
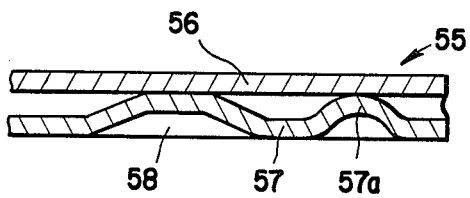
Figure 7:
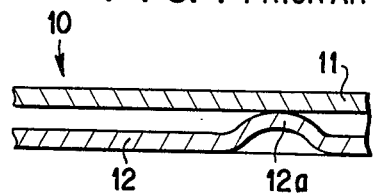
FIGS. 7 and 8 are section views similar to FIGS. 3–6 showing conventional gaskets.
Figure 8:
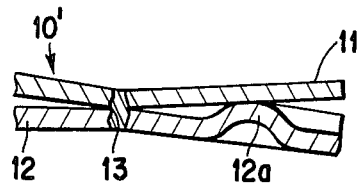

In FIG. 6, a steel laminate gasket 55 comprises a plate 56, and a plate 57 having a bead 57a and a depression 58. When the plates 56, 57 are connected together, a spot welding is applied onto the depression 58. Consequently, the plates 56, 57 are connected and maintained substantially parallel to each other.

In the above embodiments, it was explained that height of depression is substantially the same as that of the bead, but height of the depression may be slightly lower than the bead. In this case, when the gasket is initially tightened in use, all the plates become substantially parallel to each other. Consequently, the gasket can seal properly as well. In any situation, height of a depression must be determined to prevent the bead from being badly affected by the depression.

While the invention has been explained with reference to the specific embodiments of the invention, the explanation is illustrative and the invention is limited only by the appended claims.

What is claimed is:

1. A steel laminate gasket adapted to be situated between two engine parts with holes for sealing the same, comprising:
a first plate having at least one first hole corresponding to a hole of the engine parts,
a second plate situated adjacent to the first plate and having at least one second hole corresponding to the hole of the first plate and a bead extending around and adjacent to the second hole, said bead extending substantially perpendicularly to a horizontally plane of the second plate toward the first plate to abut against the first plate, and
at least two depressions formed on one of the first plate and second plate outside the bead relative to the hole and extending toward the other of the first and second plates, each depression formed on one of the first and second plates including a top portion abutting against the other of the first and second plates, a base portion having a size larger than the top portion, a diagonal side wall between the top and base portions so that each depression projecting from one of the first and second plates has an outer periphery in section in the form of a conic trapezoid, and having a height substantially the same as that of the bead so that when the first and second plates are connected together by a spot welding at the depression, the first and second plates are maintained substantially parallel to and spaced apart from each other, said depressions being located symmetrically relative to the hole and situated away from the bead so that when lateral stress applied to the first and second plates is different, the first and second plates slide with each other to thereby absorb the stress.

2. A steel laminate gasket according to claim 1, in which said depressions are formed on the first plate.

3. A steel laminate gasket according to claim 2, further comprising a third plate having at least one third hole, said third plate being situated adjacent to the second plate so that the third hole corresponds to the first and second holes and the first, second and third plates are connected together by means of the spot welding at the depression.

4. A steel laminate type manifold gasket adapted to be situated between a manifold and a cylinder head, comprising:
a first plate having a first central hole communicating with the manifold and the cylinder head, and at least two first side holes situated adjacent to the first central hole,
a second plate having a second central hole corresponding to the first central hole, at least two second side holes corresponding to the first side holes, and a bead extending around and adjacent to the second central hole, said bead extending substantially perpendicularly to a horizontal plane of the second plate toward the first plate to abut against the first plate, said first and second plates being adapted to be firmly connected to the manifold and the cylinder head by means passing through the first and second side holes, and
at least two depressions formed on one of the first plate and the second plate and extending toward the other, said depressions being arranged symmetrically relative to the first and second central holes, each depression being situated outside the bead and having a height substantially the same as that of the bead so that when the first and second plates are stacked and then connected together by a spot welding applied to the depression, the first and second plates are spaced apart from and retained substantially parallel to each other, said depressions being located away from the bead so that when lateral stress applied to the first and second plates is different, the first and second plates slide with each other to thereby absorb the stress.

5. A steel laminate gasket according to claim 4, further comprising a third plate having a third central hole corresponding to the first central hole, and at least two third side holes corresponding to the first side holes, said third plate being situated adjacent to the second plate.

6. A steel laminate gasket according to claim 4, in which each depression formed on one of the first and second plates includes a top portion abutting against the other of the first and second plates, a base portion having a size larger than the top portion, and a diagonal side wall between the top and base portions so that the depression has a conic trapezoid form.

7. A steel laminate gasket adapted to be situated between two engine parts with holes for sealing the same, comprising:

two first plates, each first plate having at least one first hole corresponding to a hole of the engine parts, two second plates, each second plate being situated adjacent to each first plate respectively and having at least one second hole corresponding to the holes of said first plates and a bead extending around and adjacent to the second hole, said bead extending substantially perpendicularly to a horizontal plane of the second plate toward the corresponding first plate to abut against the first plate, and depressions, at least two depressions being formed on each first plate outside the bead relative to the hole and extending toward the corresponding second plate, each depression having a height substantially the same as that of the bead so that when the first and second plates are connected together by a spot welding at the depression, the first and second plates are maintained substantially parallel to and spaced apart from each other, said depressions being located symmetrically relative to the hole and situated away from the bead so that when lateral stress applied to the first and second plates is different, the first and second plates slide with each other to thereby absorb the stress, said two first and second plates being arranged so that the first plates are located outside the second plates and the second plates face with each other, which are connected together by means of the spot welding at the depressions.

* * * * *